(12) United States Patent
Zientek et al.

(10) Patent No.: US 12,498,530 B2
(45) Date of Patent: Dec. 16, 2025

(54) SENSOR DEVICE, LEADTHROUGH, AND METHOD

(71) Applicant: Hilti Aktiengesellschaft, Schaan (LI)

(72) Inventors: Michal Wladyslaw Zientek, Nenzing (AT); Kleidi Moisi, Grabs (CH); Brendan Voss, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 224 days.

(21) Appl. No.: 18/035,362

(22) PCT Filed: Nov. 10, 2021

(86) PCT No.: PCT/EP2021/081243
§ 371 (c)(1),
(2) Date: May 4, 2023

(87) PCT Pub. No.: WO2022/106278
PCT Pub. Date: May 27, 2022

(65) Prior Publication Data
US 2023/0400656 A1 Dec. 14, 2023

(30) Foreign Application Priority Data
Nov. 23, 2020 (EP) .................................. 20209136

(51) Int. Cl.
*G02B 6/44* (2006.01)
*G02B 6/36* (2006.01)

(52) U.S. Cl.
CPC ......... *G02B 6/4459* (2013.01); *G02B 6/3644* (2013.01); *G02B 6/443* (2013.01)

(58) Field of Classification Search
CPC ..... G02B 6/4459; G02B 6/3644; G02B 6/443
See application file for complete search history.

(56) References Cited

U.S. PATENT DOCUMENTS

| | | | |
|---|---|---|---|
| 6,599,028 B1 * | 7/2003 | Shu | F23D 14/82 385/139 |
| 8,007,284 B2 * | 8/2011 | Smith | H02G 3/0666 439/32 |
| 2008/0128998 A1 | 6/2008 | Klein et al. | |
| 2011/0036148 A1 | 2/2011 | Stubler et al. | |
| 2020/0021091 A1 * | 1/2020 | Purdy | H02G 3/0462 |
| 2020/0208769 A1 * | 7/2020 | Du | F16L 55/28 |
| 2020/0300404 A1 | 9/2020 | Wang et al. | |

FOREIGN PATENT DOCUMENTS

| | | |
|---|---|---|
| DE | 3700473 C1 | 9/1988 |
| WO | WO 2020/065659 A1 | 4/2020 |

OTHER PUBLICATIONS

International Searching Authority, International Search Report and Written Opinion in International Application No. PCT/EP2021/081243, mailed Feb. 4, 2022.

* cited by examiner

*Primary Examiner* — Tina Wong
(74) *Attorney, Agent, or Firm* — Grüneberg and Myers PLLC (57) ABSTRACT

A sensor device for a leadthrough for passing conduits through a constructional component is provided, wherein the sensor device is configured to sense at least one property of the leadthrough, and wherein the sensor device is, preferably detachably, attachable to the leadthrough. A leadthrough and a method of estimating a property of a leadthrough are also provided.

20 Claims, 6 Drawing Sheets

SENSOR DEVICE, LEADTHROUGH, AND METHOD

CROSS-REFERENCE TO RELATED APPLICATIONS

This patent application is the U.S. National Stage of International Patent Application No. PCT/EP2021/081243, filed Nov. 10, 2021, which claims the benefit of European Patent Application No. 20209136.9, filed Nov. 23, 2020, which are each incorporated by reference.

The present invention relates to a sensor device for a leadthrough for passing conduits through a constructional component. It further relates to a leadthrough and a method.

A leadthrough with a jacket tube is described in US 2008128998 A1.

It is an object of the present invention to provide cost-efficient devices and a method, that permit to pass conduits through a constructional component while ensuring persistently working protection against hazards, for example a persistently working fire-protection.

This is achieved in a number of aspects of the present invention, in which a first aspect is a sensor device for a leadthrough for passing conduits through a constructional component, wherein the sensor device is configured to sense at least one property of the leadthrough, and wherein the sensor device is, preferably detachably, attachable to the leadthrough. The sensor device or at least a part of the sensor device may be attachable at at least one of an inside, a first end, or a second end of the leadthrough. The sensor device may be configured to sense said property in a direct or in an indirect manner.

Thus, a basic idea behind the invention is to provide a sensor for monitoring a condition of the leadthrough, for example, whether the leadthrough is in a condition of fully-working protection against fire, smoke, water, noise, or the like. In particular, said property may be or correspond to a closure status of the leadthrough. Having up-to-date knowledge about such a condition permits to decide on and to take necessary actions.

A leadthrough may be enhanced during installation by attaching the sensor device according to the invention. An additional option is to retrofit a leadthrough already mounted in a construction element or the like with the sensor device. For this, standard leadthroughs may be used. Thus, the solution according to the invention is very cost-efficient.

The leadthrough may comprise a jacket tube.

The sensor device may be shaped in the form of an adapter. It may comprise at least one fixing element for fixing the sensor to the leadthrough. The fixing element may be at least one of a hook, a clamp, or a magnet.

Hence, the invention enables to have an add-on in the form of a special adapter which allows to observe said property, for example the closure status and/or a surface occupation area of the leadthrough or the jacket tube. Said property may be inspected digitally.

The conduit may be a cable, a pipe, or the like.

In a preferred embodiment of the invention, said property may be a cross-sectional area, in particular a free cross-sectional area or an occupied cross-sectional area. It may also be a ratio relating to a cross-sectional area, for example a ratio between a free and an occupied cross-sectional area.

In a particularly preferred embodiment, said property may describe a free or an occupied clearance within a cross-sectional area of the leadthrough, for example at the first end of the leadthrough. Thus, said property may relate to the degree to which the leadthrough is occupied by one or more conduits. It may also relate to whether fire, gas, smoke, water, or the like may pass from one side of the construction element through the leadthrough to an opposite side of the construction element. Generally speaking, said property may be a measure of the extent to which the leadthrough is capable of protecting against a hazard.

Furthermore, said property may be or at least relate to external impact on the leadthrough. In particular, it may be a measure of the safety of the leadthrough. It may relate to a safety feature of the leadthrough. For example, said property may be an indicator indicating a manual manipulation of the leadthrough. Additionally, or alternatively, it may be a measure of external impacts on the leadthrough. Thus, it may be a measure of one or more drops, one or more seismic events, vibration, etc.

The sensor device may comprise at least one optical sensor. The optical sensor may be susceptible to at least one of infrared light, visible light or ultraviolet light. It may comprise a plurality of sensor elements; in particular, the sensor device may comprise an image sensor. Additionally, or alternatively, it may comprise one or more photoelectric elements. The at least one photoelectric element may be a photodiode or a phototransistor.

Another favorable option is that the sensor device comprises at least one microwave sensor. The microwave sensor may be a radar sensor. It may be configured for emitting and/or receiving electromagnetic waves having a working frequency of at least 1 GHz. Preferably, the sensor device may be configured to emit and/or receive electromagnetic waves having a working frequency of at least 0.01 THz. For example, the working frequency may be 0.1 THz, e. g. 0.06 THz. The working frequency may be in a license-free usable frequency range. Generally, a spatial resolution of the sensor device may be increased by increasing the working frequency.

Such a microwave sensor, in particular a radar sensor, may permit to map a cross-sectional area, for example, at at least one end of the leadthrough.

Additionally, or alternatively, the sensor device may comprise at least one acoustical sensor element, in particular a microphone. The acoustical sensor may be susceptible to at least one of human audible sound, infrasonic sound or ultrasonic sound. In particular, the acoustical sensor may comprise an ultrasonic speaker.

In a preferred embodiment the sensor device may comprise a distance measurement element. The optical sensor, the microwave sensor and/or the acoustical sensor may form and/or comprise the distance measurement element. The distance measurement element may be configured to measure a time of flight, for example a time of flight of a light signal or an ultrasonic sound signal.

Furthermore, the sensor device may comprise an inertial measurement unit (IMU). The IMU may be receptible to the gravitation. It may be configured to detect a change of pose and/or of orientation of the sensor device and/or of a part of the leadthrough. In particular, it may be configured to measure a turning angle.

The sensor device may comprise an emitter and a receiver configured to receive a signal from the emitter. The signal may be an optical or a microwave signal, for example based on at least one of infrared, visible or ultraviolet light or microwaves. It may be an acoustical signal, for example based on at least one of infrasonic sound, human audible sound, or ultrasonic sound.

The sensor device may work in a cyclic way. Thus, the signal may be emitted in a cyclic manner. For example, the signal may be emitted once every minute, once every hour or with a cycle duration between 1 minute and 1 hour; it may have a cycle time shorter than 1 minute or longer than 1 hour, for example once a day. In particular, a low energy consumption may be achieved by a long cycle duration. A short cycle duration makes it possible to monitor said property continuously or at least essentially continuously.

The acoustical sensor or the optical sensor may be both the emitter and the receiver. For this, the optical sensor may comprise a light-emitting diode. Also, the acoustical sensor may comprise an acoustical transducer, e. g. an ultrasonic transducer. Thus, similar sensors, in particular similar acoustical or optical sensors, may be attached to the first and to the second end of the jacket tube, wherein one of the similar sensors may be configured to act as emitter, and the other one of the similar sensors may be configured to act as receiver. Thus, further cost savings may be realized due to economies of scale. Moreover, by switching the type of use of the similar sensors, the sensor device may measure bidirectionally through the leadthrough. Furthermore, the same type of sensor device may be used on either side of the constructional element or, respectively, on either end of the leadthrough.

At least one of the emitter or the receiver may comprise an array of sub-elements, so that the sensor device may measure in a rastered manner. For example, the sensor device may comprise or at least work as an array of photoelectric barriers, wherein light beams of the photoelectric barriers may, preferably, be directed in directions parallel, or at least essentially parallel, to one another. In particular, the sensor device may comprise and/or may be configured to generate one or more light grids, in particular one or more light curtains.

The sensor device may be configured to observe a control element of the leadthrough, the control element being configured to adjust said property. The adjustment of said property may be direct or indirect. For example, the control element may be a handle for opening or closing the leadthrough by turning the handle. Thus, by observing the turning angle of the handle, it can be determined whether the leadthrough is open or closed.

Measurement data acquired by the sensor device may be processed or at least preprocessed in place. Thus, it is favorable if the sensor comprises a data processing unit, for example having a microprocessor.

The sensor device is very versatile if the data processing unit comprises a machine-learning unit. The machine-learning unit may be configured as artificial neural net; it may be configured to implement a deep-learning algorithm.

The sensor device may, thus, be configured for image and/or sound data processing. It may be configured to recognize, count and/or measure the size of conduits in the leadthrough. It may be configured to calculate at least one of a free or an occupied cross-sectional area of the leadthrough from the measurement data.

The said property may be an acoustical performance, in particular an acoustical conductivity or an acoustical insulation. For example, the sensor device may be configured to measure an acoustic insulation performance.

Additionally, or in the alternative, the said property may be a thermal performance, in particular a thermal conductivity or a thermal insulation. Hence, for example, the sensor device may be configured to measure a thermal insulation performance.

The sensor device may further comprise an electric power supply, in particular a battery, a rechargeable accumulator, or a thermoelectric element.

Moreover, it may comprise a communication interface, in particular a wireless communication interface. The communication interface may be a low-power communication interface, for example a communication interface commonly known as "Bluetooth Low Energy" or "ZigBee", or the like. So, said property, in particular the closure status or the surface occupation area, may be checked wirelessly, for example by means of a dedicated readout device or a communication device, e. g. a smartphone, adapted to communicate with the sensor device. The readout device may be mobile or fixed.

The communication interface may also comprise an identifier. For example, it may be configured to transmit a unique identifying code for identifying the sensor device or at least the type of sensor device.

The communication interface may also be configured for active or passive localization of the sensor device. For example, the communication interface may be configured to be localized by triangulation.

The communication interface may further be configured to collaborate with other devices, in particular with at least one of other sensor devices, construction tools, for example measuring tools or power tools, other consumables, or, in particular local and/or distanced, alarm systems.

Another aspect of the invention is a leadthrough for passing conduits through a constructional component, the leadthrough comprising at least one sensor device according to the invention. The sensor device may be, preferably detachably, attached to the leadthrough. The leadthrough may comprise a jacket tube.

In particular, a first part of the sensor device or a first sensor device may be arranged adjacent to a first end of the leadthrough and a second part of the sensor device or a second sensor device may be arranged adjacent to a second end of the leadthrough, wherein, preferably, the second end is opposite to the first end.

The leadthrough may be configured as at least one of a fire-protecting device or a noise-protecting device.

Additionally, or in the alternative, the leadthrough may be configured as a thermal insulation.

Another aspect of the invention is a method of estimating a property of a leadthrough for passing conduits through a constructional component, wherein a sensor device according to the invention is used for sensing said property of the leadthrough, and wherein the sensor device is detachably attached to the leadthrough.

Thus, by attaching the sensor device to a leadthrough installed in a constructional component, the leadthrough may be retrofitted with the sensor device even after installation. Hence, it may be cost-efficiently equipped with an option to observe said property. If, for example, the sensor device is configured to observe a property related to fire-protection, e. g. the extent to which the leadthrough is open, an alarm or the like may be raised, if the leadthrough remains open to a certain extent over an unacceptably long duration of time. In response to the alarm, the leadthrough may be checked manually and/or closed. So, conduits may be passed through the constructional component while ensuring persistently working protection against hazards, in particular fire-protection.

In one variant of the method according to the invention, the sensor device observes said property via an array of sub-elements. The array of sub-elements may comprise one or more light grids, in particular one or more light curtains.

The invention will be described further, by way of example, with reference to the accompanying drawings which illustrate preferred embodiments thereof, it being understood that the following description is illustrative of and not limitative of the scope of the invention. The features shown there are not necessarily to be understood to scale and are presented in such a way that the special features of the invention are clearly visible. The various features may be realized individually or in combination in any desired way in variants of the invention.

Same reference signs are used for functionally equivalent elements in all figures.

Figure 1:
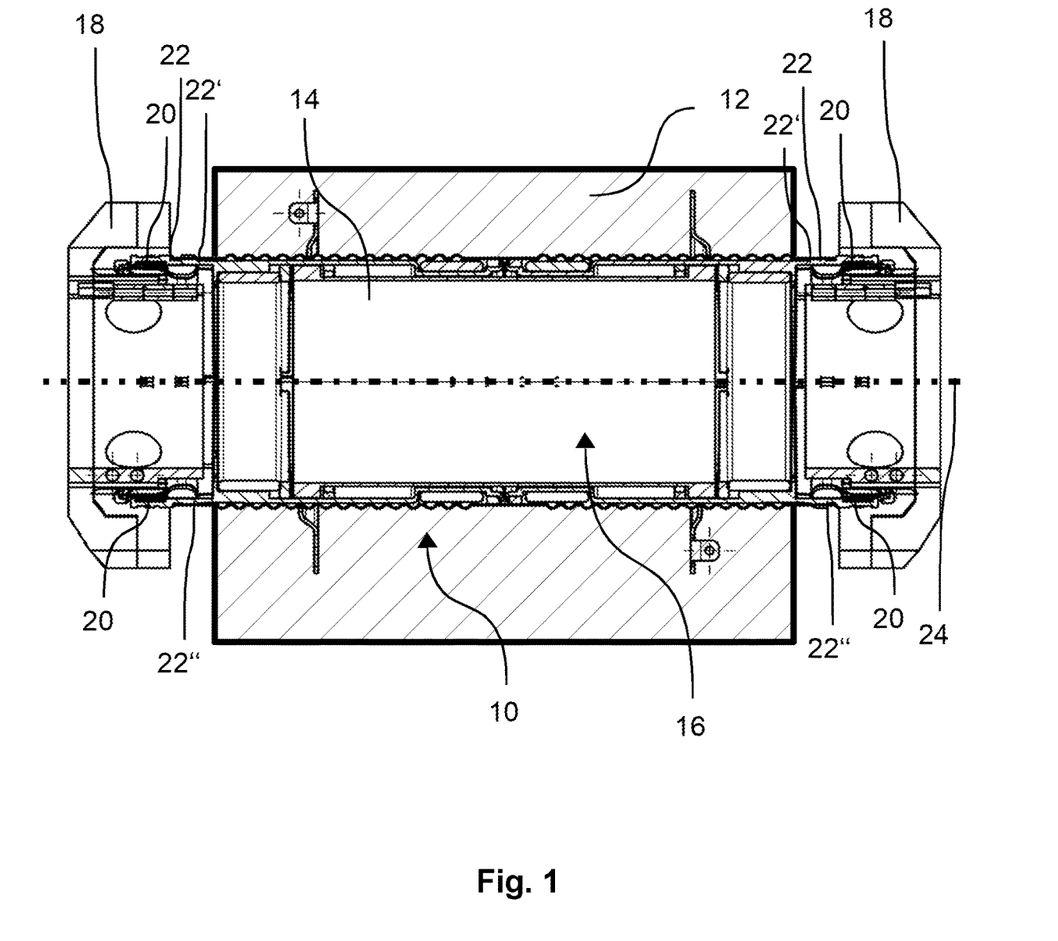
FIG. 1 shows a longitudinal sectional view of a leadthrough with two sensor devices.

FIG. 1 schematically shows a longitudinal sectional view of a leadthrough 10 for passing conduits through a constructional component 12, a wall.

The leadthrough 10 comprises a jacket tube 14 with a penetration space 16, through which conduits can pass from one side of the constructional component to its other side. The leadthrough 10 can be opened or closed. Thus, a cross-sectional area of the jacket tube 14, in particular of the penetration space 16, may be adjusted to a certain closure status.

Two sensor devices 18 are attached, in particular detachably attached, to the leadthrough 10 via magnets 20. The sensor devices 18 are configured to sense the closure status of the jacket tube 14 as a property of the jacket tube 14.

Thus, the sensor devices 18 have the form of adapters to be attached to the leadthrough 10.

The sensor devices 18 incorporate further equipment, in particular an electric energy source, a data processing unit comprising a microcontroller having a microprocessor, and one or more sensors.

The sensor devices 18 are attached to handles 22 of the leadthrough 10. Each one of the handles 22 comprises a first protrusion 22', according to FIG. 1 on the upper side of the leadthrough 10, and a second protrusion 22'', according to FIG. 1 on the lower side of the leadthrough 10.

The handles 22 can be turned manually around a longitudinal axis 24 of the jacket tube 14, thus opening or closing the jacket tube 14. In that way, the handles 22 constitute control elements that are configured to adjust the clearance and, hence, the closure status of the jacket tube 14.

In the following, to facilitate the understanding of the invention, it is assumed without prejudice that only one of the handles 22 is manipulated, while the other handle 22 remains at a fixed position in relation to the leadthrough 10.

Figure 2A:
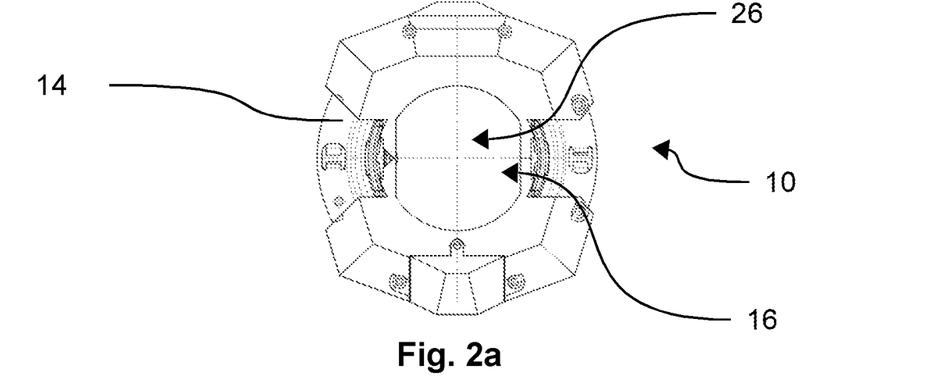
FIGS. 2a to 2c show front views of the leadthrough with three different closure status.
Figure 2B:
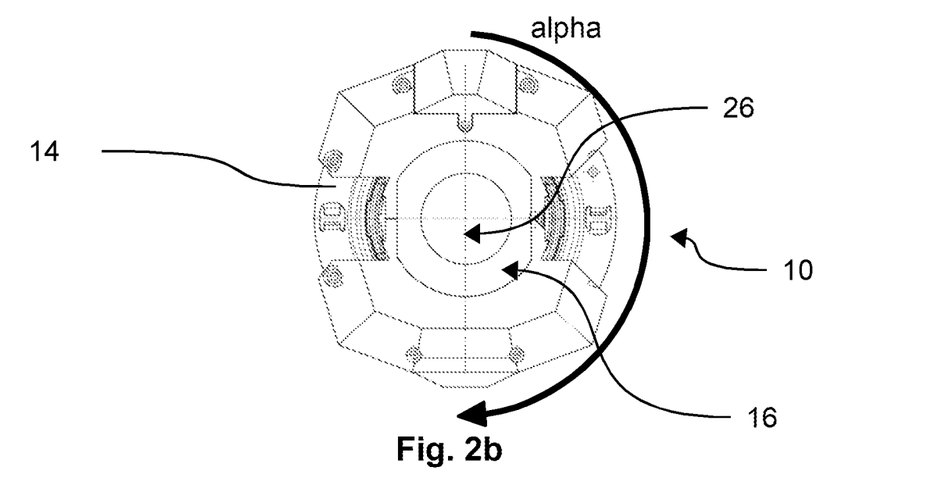
Figure 2C:
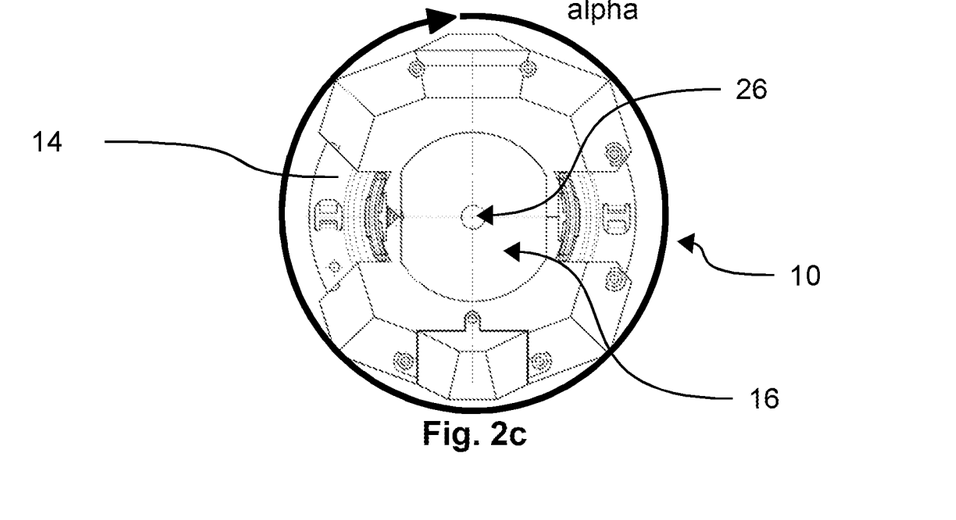

FIGS. 2a, 2b, and 2c schematically show front views of the leadthrough 10 with various status of the closure of the jacket tube 14. In particular, FIG. 2a shows the jacket tube 14 fully opened. FIG. 2b shows the jacket tube 14 partly closed. And FIG. 2c shows the jacket tube 14 maximally closed. Generally speaking, the situations corresponding to FIGS. 2a, 2b, and 2c differ from one another in relation to the clearance of a cross-sectional area 26 of the penetration space 16.

The status of the closure and thus from the clearance of the cross-sectional area 26 depend on the angle alpha at which the manipulated handle 22 (FIG. 1) has been turned.

In the following, various embodiments of the sensor device 18 are presented which essentially differ in the way of measuring the clearance of the cross-sectional area 26.

Figure 3A:
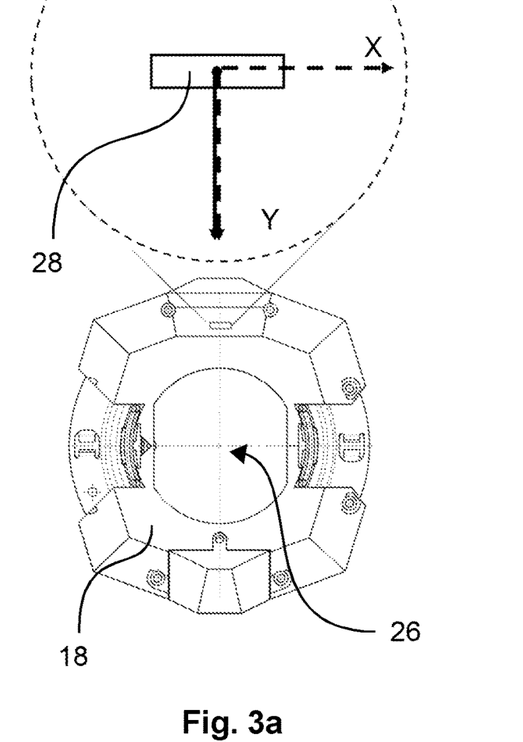
FIGS. 3a to 3b show front views of a leadthrough with a sensor device having an IMU.
Figure 3B:
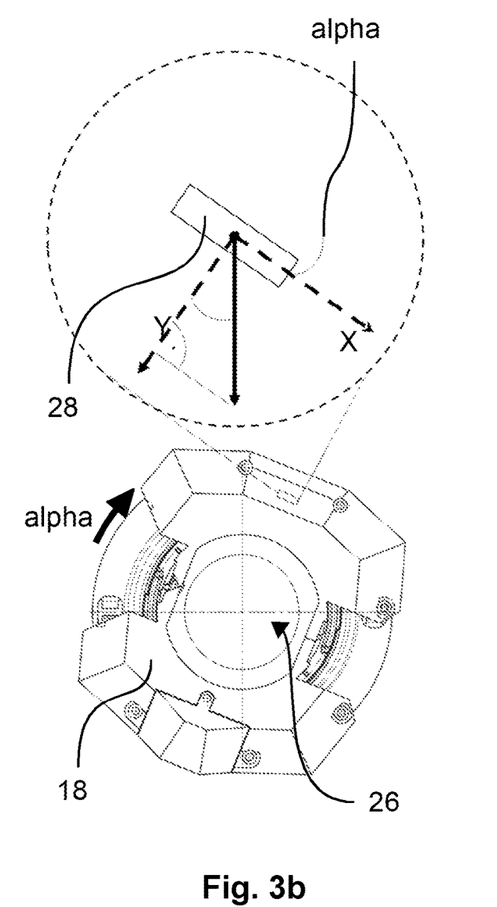

In the embodiment of the sensor device 18 shown in FIGS. 3a and 3b, the sensor device 18 comprises an IMU 28.

The sensor device 18 attached to the manipulated handle 22 (FIG. 1), and thus the sensor device 18's IMU 28 (schematically shown in the upper parts of FIGS. 3a and 3b), turns by the same angle alpha and the same rotational frequency as the manipulated handle 22. Hence, the turn angle alpha may be measured immediately by the IMU 28, and in particular by measuring a change of pose of the IMU 28.

In particular, the IMU 28 is configured to measure accelerations in two directions X and Y, the directions X and Y being perpendicular to one another and forming an IMU 28-related coordinate system. The accelerations are measured relative to the gravity acceleration, so that the turn angle alpha by which the manipulated handle 22 and attached to it the sensor device 18 have been turned to.

Then, the turn angle alpha allows to measure the closure status indirectly, as the closure status is correlated to the turn angle alpha. In particular for some turn angles alpha, for example for turn angles ranging from 0 to less than 170°, the relation may be linear or at least approximately linear. For other turn angles alpha, for example equal or greater than 170°, the relation may become exponential or at least approximately exponential.

Therefore, the closure status or the clearance of the cross-sectional area 26 are estimated via the above-mentioned relation between the turn angle alpha and the clearance.

Figure 4:
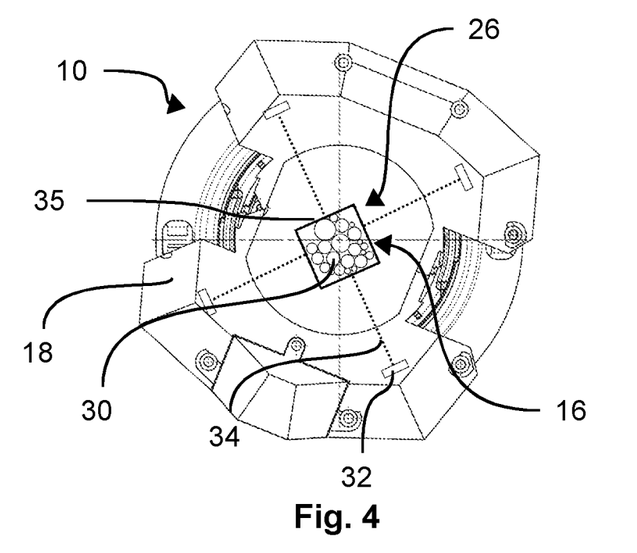
FIG. 4 shows a front view of a leadthrough with a sensor device having a plurality of distance measurement elements.

Now turning to FIG. 4, which schematically shows a front view of a further leadthrough 10 with a further embodiment of a sensor device 18. In the example according to FIG. 4 the clearance of the cross-sectional area 26 of the penetration space 16 is reduced by conduits 30 passing through the leadthrough 10.

The sensor device 18 is configured to measure an occupied space of the cross-sectional area 26.

It comprises several, preferably at least four, distance measurement elements 32. Each of the distance measurement elements 30 may comprise at least one of one or more optical, one or more microwave, or one or more ultrasonic time-of-flight sensors. They, thus, emit and receive optical, microwave or acoustical measuring beams 34.

The distance measurement elements 32 are located in the sensor device 18. They provide information about distances between each one of the distance measurement elements 32 and objects, in particular the conduits 30, located in the respective paths of their measuring beams 34. For simplification of the drawings, only one of the distance measurement elements 32 and one of the measuring beams 34 is marked in each one of the FIGS. 4a and 4b.

As shown in FIG. 4, the distance measurement elements 32 are positioned in such a way as to direct their measuring beams 34 towards the center of the sensor device 18 and thus towards the penetration space 16.

Based on the measured distances, the sensor device 18 with its data processing unit calculates the dimensions, in particular the area, of a hypothetical bounding rectangle 35 enclosing the conduits 30 in the cross-sectional area 26 of the penetration space 16.

The area of the bounding rectangle is then compared to the size of the cross-sectional area 26 in order to determine the closure status.

Depending on the result of the comparison, the sensor device 18 may at least one of provide information to a user about the closure status, provide information on a current occupancy, or, preferably after a predetermined waiting time, raise an alarm.

Figure 6A:
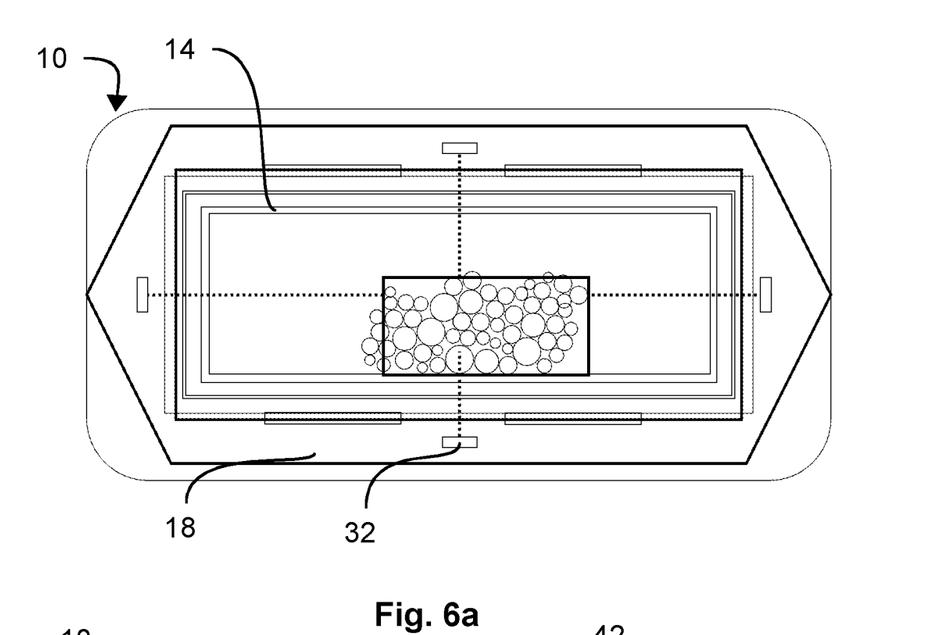
FIGS. 6a to 6b show front views of leadthroughs with at least essentially rectangular cross-sections.

As is shown in FIG. 6a, which shows an essentially rectangular leadthrough 10 with a sensor device 18 similarly equipped with distance measurement elements 32 (one of which is marked in FIG. 6a), this method of estimation of the clearance and/or the closure status via the determination of a bounding rectangle can also be applied to other, e. g. rectangular, geometries of leadthroughs 10, jacket tubes 14, or, respectively, penetration spaces 16.

Figure 5:
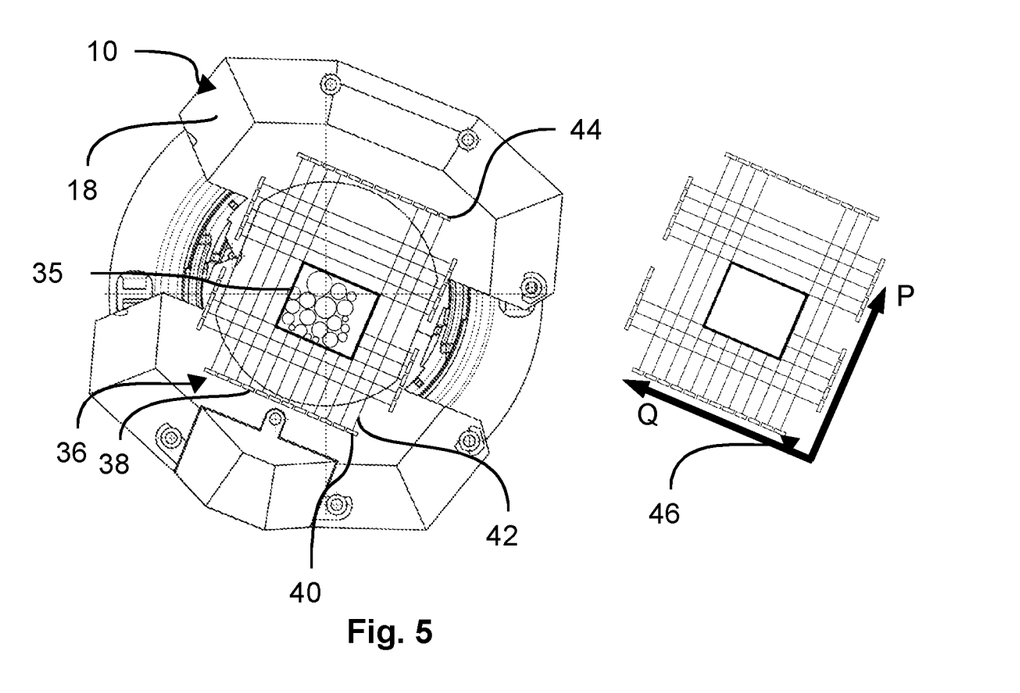
FIG. 5 shows a front view of a leadthrough with a sensor device having an array of light barriers.

As is shown in FIG. 5, another method of estimation of the clearance and/or the closure status may use sensor devices 18 attached to a leadthrough 10, the sensor device comprising an array 36 of sub-elements. The array 36 of sub-elements is, in this example, an array of light barriers 38, of which only one light barrier 38 is marked in FIG. 5 in order to simplify the drawing.

Each one of the light barriers 38 comprises an emitter 40 emitting a light beam 42 and a receiver 44, the receiver 44 opposing the emitter 40 and configured to receive the light beam 42.

The emitters 40 may be configured to emit at least one of human visible light, infrared, ultraviolet as light beams 42. The emitters 40 may comprise one or more light-emitting diodes (LED).

The receivers 44 may comprise one or more photodiodes, for example an LED configured to receive light, or one or more phototransistors.

Alternatively, in other embodiments of the invention, the emitters 40 and the receivers 44 may be configured to emit or, respectively, receive microwaves or sound, in particular ultrasonic sound.

As is schematically shown in the right part of FIG. 5, all light beams 42 are emitted in either one of two directions P and Q, the two directions P and Q being perpendicular to one another, within a plane 46.

The array 36 of light barriers 38, hence, forms a matrix-like light grid. In particular, the light beams 42 produced by the emitters 40 cover the cross-sectional area 26 of the penetration space 16 of the jacket tube 14 of the leadthrough 10.

The array 36 of light barriers 38 allows for obtaining sensitivity to the presence of objects inside the penetration space 16 in the two dimensions or directions A and B. It may be noticed that a higher spatial resolution may be achieved by approaching the light barriers 38 to one another, preferably while increasing the total number of light barriers 38. In another embodiment of the invention, additional light barriers 38 may be arranged in additional arrays in one or more planes parallel to the plane spanned by the directions A and B.

When one or more objects are in the path of the light beams 42, optical connections between the emitters 40 and the corresponding receivers 44 are interrupted, which may be recorded as changes in electric output signals of the receivers 44. Based on these output signals the data processing unit can, for example, estimate the occupied area from the bounding rectangle 35 corresponding to the interrupted light beams 42.

Figure 6B:
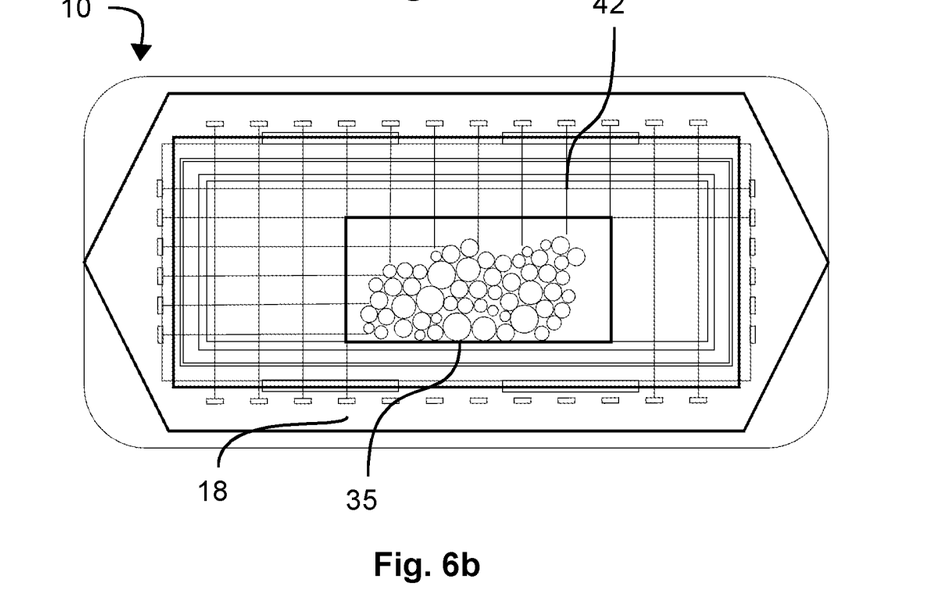

As can be seen in FIG. 6b, this method of estimating an occupied area via determining a bounding rectangle 35 by detecting interrupted light beams 42 can similarly be applied to other geometries of the leadthrough 10, e.g. to a rectangular leadthrough 10 as shown in FIG. 6b.

The measurements provided by the sensor devices 18 according to the above-mentioned embodiments according to FIGS. 3a to 6b may be effectuated once, for example on request of a dedicated readout device, or periodically.

The precision of the measurements may be improved, if the data processing unit comprises a machine-learning unit. By feeding the machine-learning unit with previously, on-site and/or off-site, acquired experimental data, the machine-learning unit can be pretrained and/or can be continuously improved. This allows to calculate areas of typical bounding freeforms instead of bounding rectangles.

A further embodiment of the sensor device 18 and, hence, further variants of the method of estimation of the clearance of the cross-sectional area 26, may result from an image capturing device, e. g. a camera, or, respectively from using an image capturing device, and subsequent data processing of acquired image data, for example by the machine-learning unit. Hence, it is possible to recognize the cross-sectional area covered by conduits 30. Due to high optical resolutions of current image capturing devices, these embodiments and the respective methods may be characterized by very high accuracies. Analogously, a further embodiment of the sensor device 18, or, respectively, of the invention, may make use of microwaves, for example radar waves, preferably of frequencies of at least 0.01 THz, e. g. 0.06 THz, and microwave-susceptible equipment instead of light and light-susceptible equipment.

In the previous description it has been assumed that only one of the two handles 22 is manipulated, while the other handle 22 remains at a fixed position in relation to the leadthrough 10. Alternatively, in the case that a sensor device 18 is arranged at each one of the ends of the leadthrough 10, the two sensor devices 18 may be configured such that a relative angle between them—instead of the pose of the manipulated handle 22 as previously described—is used as an indicator of the status of the cross-sectional area 26 or, respectively, of the closure status of the leadthrough 10.

A further embodiment respectively variant can be obtained, if a system of emitters and receivers are used, the emitters and the receivers being placed at opposite ends of the jacket tube 14.

The emitters may comprise one or more ultrasonic or light sources, for example LEDs configured to emit light, and the receivers may comprise one or more microphones or, respectively, photodiodes, in particular LEDs configured to be used as light receivers.

The emitter thus sends sound or light signals from one end of the leadthrough 10 or, respectively of the jacket tube 14, to the opposite end. The receiver measures a received intensity of the sound signals or the light signals traveling through the jacket tube 14.

Based on the signals received by the receiver, in particular their amplitudes and/or phase shifts, the data processing unit estimates the longitudinal tightness of the leadthrough 10 or the jacket tube 14 around objects inside the penetration space 16.

Figure 7:
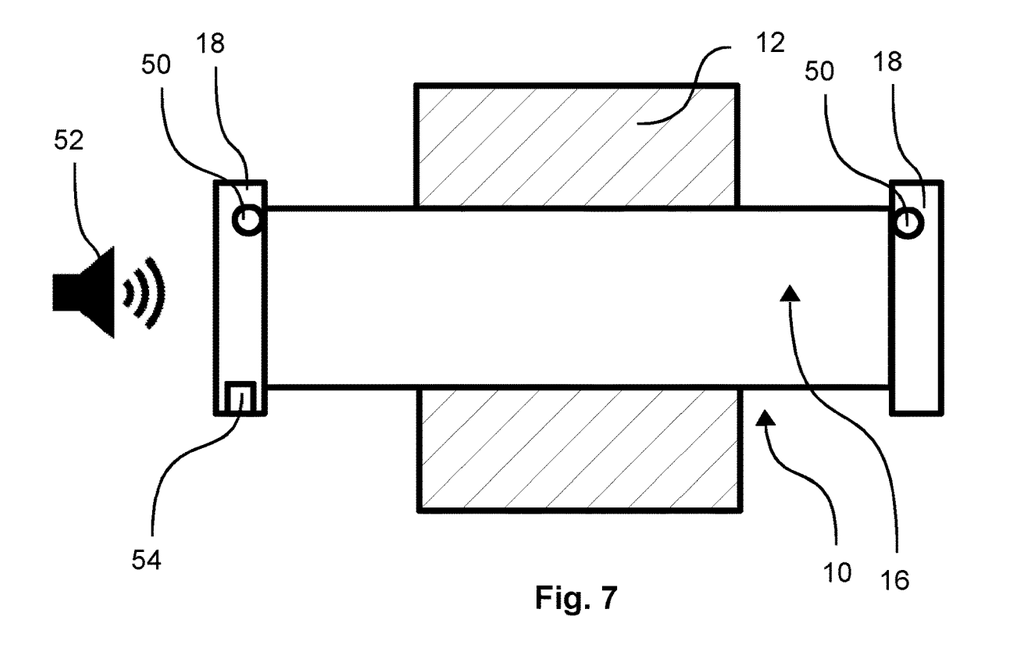
FIG. 7 shows a longitudinal sectional view of a leadthrough with two sensor devices configured to measure an acoustical conductivity.

FIG. 7 schematically shows a longitudinal sectional view of a leadthrough 10 with two sensor devices 18 configured to measure an acoustical conductivity.

Figure 8:
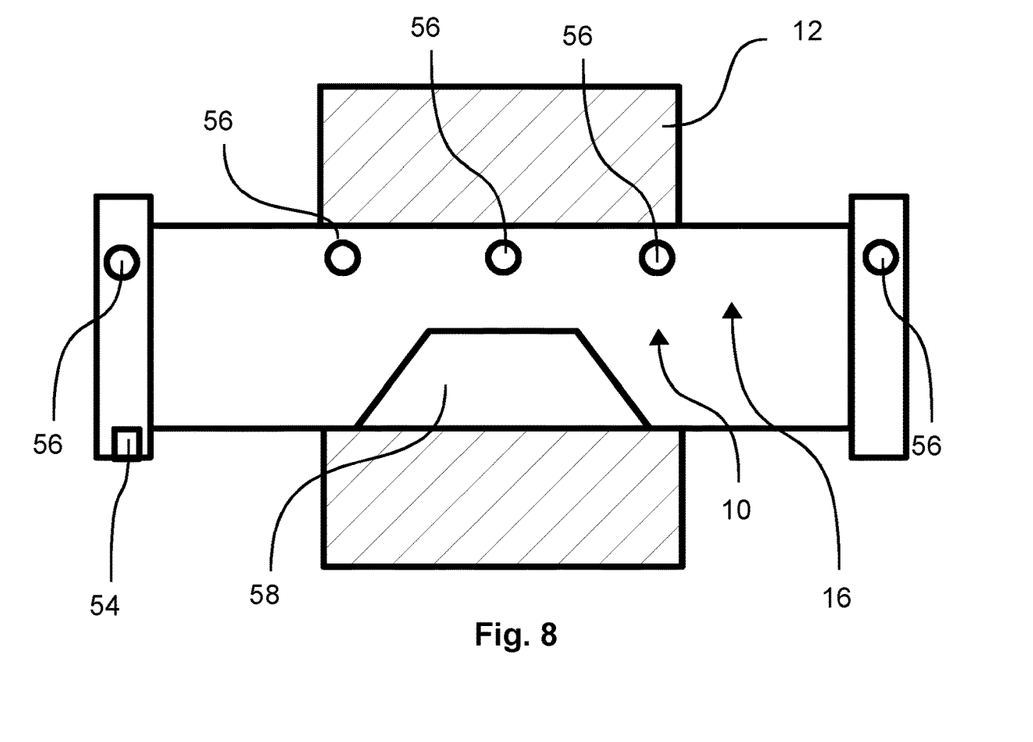
FIG. 8 shows a longitudinal sectional view of a leadthrough with two sensor devices configured to measure a thermal insulation performance.

FIG. 8 schematically shows a longitudinal sectional view of a leadthrough 10 with two sensor devices 18 configured to measure a thermal insulation performance.

If not otherwise described in the following section, the leadthroughs 10 and the sensor devices 18 according to the embodiments of FIGS. 7 and 8 may correspond to the previously described leadthroughs 10 or, respectively to the previously described sensor devices 18. In particular they may have the same or at least similar features as previously described.

In particular, the leadthroughs 10 of FIGS. 7 and 8 each comprise a jacket tube 14 with a penetration space 16, through which conduits can pass from one side of a constructional component 12 to its other side. Instead of a jacket tube 14 the leadthroughs 10 of these embodiments may be elastic or inelastic tubes.

In the example according to FIG. 7, the sensor devices 18 comprise acoustic sensor elements 50, for example microphones or transducers.

An external sound generator 52, for example a loudspeaker, may generate a sound. The acoustic sensor elements 50 may capture, in particular measure, their local sound levels received from the sound generator 52.

A data processing unit 54 may then receive sound level signals from the acoustic sensor elements 50 representing the measured sound levels.

For example, by comparing the sound levels signals, the data processing unit 54 may infer an acoustic performance of the leadthrough 10, in particular its acoustic insulation performance.

The data processing unit 54 may comprise a data interface, in particular a wireless data interface, for example a low-power wireless data interface. The data processing unit 54 may be configured to communicate with a mobile device (not shown in FIGS. 7 and 8), for example a smartphone. It thus may transmit data corresponding to the inferred acoustic performance of the leadthrough 10 to the mobile device, on which the data may be presented to a user and/or exploited for further analysis.

The embodiment of FIG. 8 corresponds to the embodiment of FIG. 7. As a difference, it comprises thermal sensor elements 56 for measuring local temperatures instead of acoustic sensor elements 50.

Preferably, acoustic sensor elements 50 may also be arranged within the leadthrough 10.

The leadthrough 10 works on the principal of measuring local temperatures inside and outside the device on either side of the partition for comparison. An assumption that the rooms on either side of the leadthrough 10 have different room temperatures may be made. Such an assumption may be reasonable as the user usually only requires an indication of thermal performance if the surrounding constructional component 12 is also expected to thermally insulate between the rooms.

Hence, by comparing the temperatures, the level of thermal leakage from one side of the leadthrough 10 to the other may be inferred by the data processing unit 54. Similarly, as described in reference to FIG. 7, the data processing unit 54 may transmit data indicating a thermal performance to the mobile device or the user.

A thermally insulating insert 58 may be introduced into the leadthrough 10, in particular into the penetrating space 16. The thermally insulating insert 58 may then improve an effective thermal insulation performance of the leadthrough 10.

The invention claimed is:

1. A sensor-enhanced leadthrough system for passing one or more conduits through a constructional component, the system comprising:
   a jacket tube defining a penetration space extending through the constructional component;
   a rotatable handle coupled to the jacket tube and configured to adjust a cross-sectional area of the penetration space by rotation;
   an inertial measurement unit device detachably mounted to the handle, and configured to measure a turn angle of the handle to determine a closure status of the leadthrough based on the adjusted cross-sectional area;
   a data processing unit configured to compute a conduit density within the cross-sectional area based on at least one of a plurality of distance measurement elements oriented toward the penetration space and configured to detect distances to the conduits for estimating a bounding region enclosing the conduits, and an array of light emitters and receivers arranged to form a light grid across the cross-sectional area, wherein interruptions in the light grid by the conduits are used to estimate the occupied portion of the cross-sectional area;
   an acoustic sensing unit comprising at least one microphone positioned to receive acoustic signals transmitted through the leadthrough, the data processing unit configured to assess an acoustic insulation performance of the leadthrough based on the received acoustic signals; and
   a thermal sensing unit comprising at least one temperature sensor positioned to detect temperatures on opposing sides of the jacket tube, the data processing unit further configured to assess a thermal insulation performance of the leadthrough based on a temperature differential across the penetration space.

2. The system of claim 1, wherein the sensor device further comprises a fixing element including at least one of a hook, a clamp, or a magnet to secure the sensor device to the leadthrough.

3. The system of claim 1, wherein the inertial measurement unit is configured to detect rotational movement of the handle to determine changes in the cross-sectional area of the penetration space.

4. The system of claim 1, wherein the data processing unit determines the bounding rectangle enclosing the conduits based on interrupted light beams.

5. The system of claim 1, wherein the array of light emitters and receivers comprises transmitters implemented as light-emitting diodes (LEDs) and receivers implemented as photodiodes.

6. The system of claim 1, wherein the at least one microphone of the acoustic sensing unit is configured to receive sound generated by an external sound generator positioned on one side of the jacket tube, and wherein the data processing unit is configured to infer the acoustic insulation performance based on a difference in sound level between opposing sides of the jacket tube.

7. The system of claim 1, wherein the thermal sensing unit is configured to detect thermal leakage across the penetration space based on a temperature differential between opposing sides of the jacket tube.

8. The system of claim 1, wherein the inertial measurement unit, the data processing unit, the at least one microphone, and the at least one temperature sensor are integrated into the sensor device.

9. The system of claim 1, wherein the data processing unit comprises a wireless data interface configured to transmit sensed performance data to a mobile device.

10. The system of claim 1, wherein the penetration space is configured to receive a thermally insulating insert to improve the thermal insulation performance of the leadthrough.

11. A method of monitoring a leadthrough for passing one or more conduits through a constructional component, the method comprising:
- defining a penetration space through the constructional component using a jacket tube;
- adjusting a cross-sectional area of the penetration space by rotating a handle coupled to the jacket tube;
- measuring a turn angle of the handle using an inertial measurement unit to determine a closure status of the leadthrough based on the adjusted cross-sectional area;
- computing a conduit density within the cross-sectional area using a data processing unit, the computing comprising at least one of:
  - detecting distances to the conduits with distance measurement elements to estimate a bounding region enclosing the conduits, and
  - forming a light grid across the cross-sectional area with light emitters and receivers, and estimating an occupied portion based on interruptions in the light grid;
- receiving acoustic signals transmitted through the leadthrough using at least one microphone;
- assessing an acoustic insulation performance based on the received acoustic signals;
- detecting temperatures on opposing sides of the jacket tube using at least one temperature sensor; and
- assessing a thermal insulation performance based on a temperature differential across the penetration space.

12. The method of claim 11, further comprising attaching the sensor device to the leadthrough using a fixing element comprising at least one of a hook, a clamp, or a magnet.

13. The method of claim 11, further comprising detecting rotational movement of the handle using the inertial measurement unit to determine changes in the cross-sectional area of the penetration space.

14. The method of claim 11, further comprising determining the bounding rectangle enclosing the conduits based on interrupted light beams.

15. The method of claim 11, wherein forming the light grid comprises operating transmitters implemented as light-emitting diodes (LEDs) and receivers implemented as photodiodes.

16. The method of claim 11, further comprising receiving sound generated by an external sound generator positioned on one side of the jacket tube using the at least one microphone of the acoustic sensing unit, and inferring the acoustic insulation performance based on a difference in sound level between opposing sides of the jacket tube.

17. The method of claim 11, further comprising detecting thermal leakage across the penetration space using the thermal sensing unit based on a temperature differential between opposing sides of the jacket tube.

18. The method of claim 11, wherein the inertial measurement unit, the data processing unit, the at least one microphone, and the at least one temperature sensor are integrated into the sensor device.

19. The method of claim 11, further comprising transmitting sensed performance data to a mobile device via a wireless data interface of the data processing unit.

20. The method of claim 11, further comprising inserting a thermally insulating insert into the penetration space to improve the thermal insulation performance of the leadthrough.

* * * * *